United States Patent
Miao et al.

(10) Patent No.: US 11,200,230 B2
(45) Date of Patent: Dec. 14, 2021

(54) COST-BASED OPTIMIZATION FOR DOCUMENT-ORIENTED DATABASE QUERIES

(71) Applicant: Couchbase, Inc., Santa Clara, CA (US)

(72) Inventors: Bingjie Miao, Englewood, CO (US); Raghupathi Keshava Murthy, Union City, CA (US); Marco Greco, Birchanger (GB); Prathibha Bisarahalli Prabhakar, Bangalore (IN)

(73) Assignee: Couchbase, Inc., Santa Clara, CA (US)

( * ) Notice: Subject to any disclaimer, the term of this patent is extended or adjusted under 35 U.S.C. 154(b) by 0 days.

(21) Appl. No.: 16/785,499

(22) Filed: Feb. 7, 2020

(65) Prior Publication Data
US 2021/0042302 A1 Feb. 11, 2021

(30) Foreign Application Priority Data
Aug. 9, 2019 (IN) .............................. 201941032385

(51) Int. Cl.
*G06F 16/2453* (2019.01)
*G06F 16/93* (2019.01)
*G06F 16/2457* (2019.01)
*G06F 16/2458* (2019.01)

(52) U.S. Cl.
CPC ...... *G06F 16/2453* (2019.01); *G06F 16/2462* (2019.01); *G06F 16/24578* (2019.01); *G06F 16/93* (2019.01)

(58) Field of Classification Search
CPC .............................. G06F 16/93; G06F 16/2453
See application file for complete search history.

(56) References Cited

U.S. PATENT DOCUMENTS

| | | |
|---|---|---|
| 9,760,571 B1 * | 9/2017 | Ben-Natan .............. G06F 16/93 |
| 2005/0190949 A1 | 9/2005 | Weber |
| 2010/0138407 A1 | 6/2010 | Fraser et al. |
| 2012/0102377 A1 | 4/2012 | Viswanathan et al. |
| 2014/0379693 A1 | 12/2014 | May et al. |
| 2017/0031990 A1 | 2/2017 | Chakkappen et al. |
| 2018/0095968 A1 * | 4/2018 | Seki .................... G06F 16/2462 |
| 2019/0138743 A1 * | 5/2019 | Nerurkar ............. G06F 21/6245 |
| 2020/0379999 A1 * | 12/2020 | Xia ................... G06F 16/24542 |

OTHER PUBLICATIONS

PCT International Search Report and Written Opinion, PCT Application No. PCT/US20/45175, dated Oct. 21, 2020, 13 pages.

* cited by examiner

*Primary Examiner* — Hau H Hoang
(74) *Attorney, Agent, or Firm* — Fenwick & West LLP

(57) ABSTRACT

A document-oriented database system generates an optimal query execution plan for database queries on an untyped data field included in a collection of documents. The system generates histograms for multiple types of data stored by the untyped data field and uses the histograms to assign costs to operators usable to execute the database query. The system generates the optimal query execution plan by selecting operators based on the assigned costs. In various embodiments, the untyped data field stores scalars, arrays, and objects.

20 Claims, 9 Drawing Sheets

COST-BASED OPTIMIZATION FOR DOCUMENT-ORIENTED DATABASE QUERIES

CROSS REFERENCE TO RELATED APPLICATIONS

This application claims the benefit of Indian Provisional Application No. 201941032385, filed Aug. 9, 2019, which is incorporated by reference in its entirety.

BACKGROUND

Field of Art

This disclosure relates in general to document-oriented databases, and in particular to performing cost-based optimization of document-oriented database queries.

Description of the Related Art

Enterprises store data in various types of data stores such as relational databases, object-oriented databases, graph databases, document-oriented databases and so on. A large amount of data is stored in relational databases that have a well-defined schema. Relational databases allow users to perform queries on the data, for example, using a query language such as the structured query language (SQL). A relational database optimizes the execution of a query. Conventional techniques for query optimization are able to generate efficient execution plans for queries to relational databases since the data has well defined schema.

However, there is an increase in databases storing unstructured or semi-structured data. Examples of such data stores include document-oriented databases that store data represented using extensible markup language (XML) or JavaScript Object Notation (JSON). Such datastores may store nested objects that may have arbitrary depth of nesting of objects. Furthermore, attributes of records (i.e. fields) may be untyped, i.e., store values of different types. For example, an attribute may store both numeric values as well as alphabetic values.

Conventional techniques for querying such document-oriented databases do not optimize the queries effectively. This is so because the semi-structured nature of data makes it difficult to analyze the characteristics of various attributes. Furthermore, the number of alternative plans for a given query for such databases is typically vast. This stems from both the large number of equivalent logical query representations it might have, due mainly to commutative and associative nature of the ANSI join operator (e.g. INNER JOIN, FULL OUTER JOIN), as well as from the number of possible implementations for each logical representation (e.g. alternate indexes to correctly execute the query). As a result, conventional techniques rely on predefined rules for selecting a particular plan, which may perform very inefficiently if the database is unable to determine an efficient execution plan for the query.

SUMMARY

Embodiments of a disclosed system, method and computer readable storage medium perform cost-based optimization of queries for document-oriented databases. The system determines an optimal query execution plan for improving the speed of query execution in document-oriented databases. The system determines costs associated with various aspects of logically equivalent query execution plans for executing a given database query and selects an optimal query execution plan. In particular, an optimal query execution plan minimizes the resources used during query execution (e.g. the number of documents accessed). Identifying a query execution plan that minimizes the number of accessed documents may be achieved using statistics describing a distribution of data of several types relevant to a query included in documents stored in a document-oriented database.

To this end and others, embodiments for performing cost-based optimization of a document-oriented database query are disclosed. The database query is received by a document-oriented database system which parses the query and generates an optimal query execution plan usable to execute the query. The database query specifies a field of an unknown type (i.e. an untyped field) which can store data of various data types, the untyped field included in a collection of documents stored in a document-oriented database. The document-oriented database system identifies operators usable to execute the query statement. Using a multi-histogram representing statistics describing various ranges of values of various scalar data types stored by the untyped field, the document-oriented database system assigns a cost to the operators. Based on the assigned costs, the document-oriented database system selects operators to generate an optimal query execution plan and uses it to execute the query.

In an embodiment, the document-oriented database system combines a plurality of histograms each corresponding to a scalar data type stored by the untyped data field to generate the multi-histogram. Each histogram corresponding to a scalar data type may describe a distribution of data of the scalar data type stored by the untyped field.

In an embodiment, the query is a range query which specifies a filter that describes a range of values of an untyped field. For example, the query may access all documents that have the untyped field within a specified range. The range may have a start value and an end value such that the start value has a type T1 whereas the end value has a type T2 distinct from T1. The document-oriented database system uses the multi-histogram to determine the statistics describing the range of values. Accordingly, the document-oriented database system accesses a histogram bin b1 corresponding to the start value and a histogram bin b2 corresponding to the end value. The histogram bin b1 belongs to a histogram h1 for type T1 and histogram bin b2 belongs to histogram h2 for type T2 within the multi-histogram. Since the bins of the multi-histogram may be ordered by type, the document-oriented database system may use all the bins between b1 in H1 and b2 in H2 in the multi-histogram for determining the statistics for optimizing the range query.

In an embodiment, the untyped field stores array data structures of various sizes in one or more documents (i.e. an array field). The document-oriented database system may assign a cost to each operator based on the distribution of data values included in the arrays and the sizes of the arrays.

Figure 1:
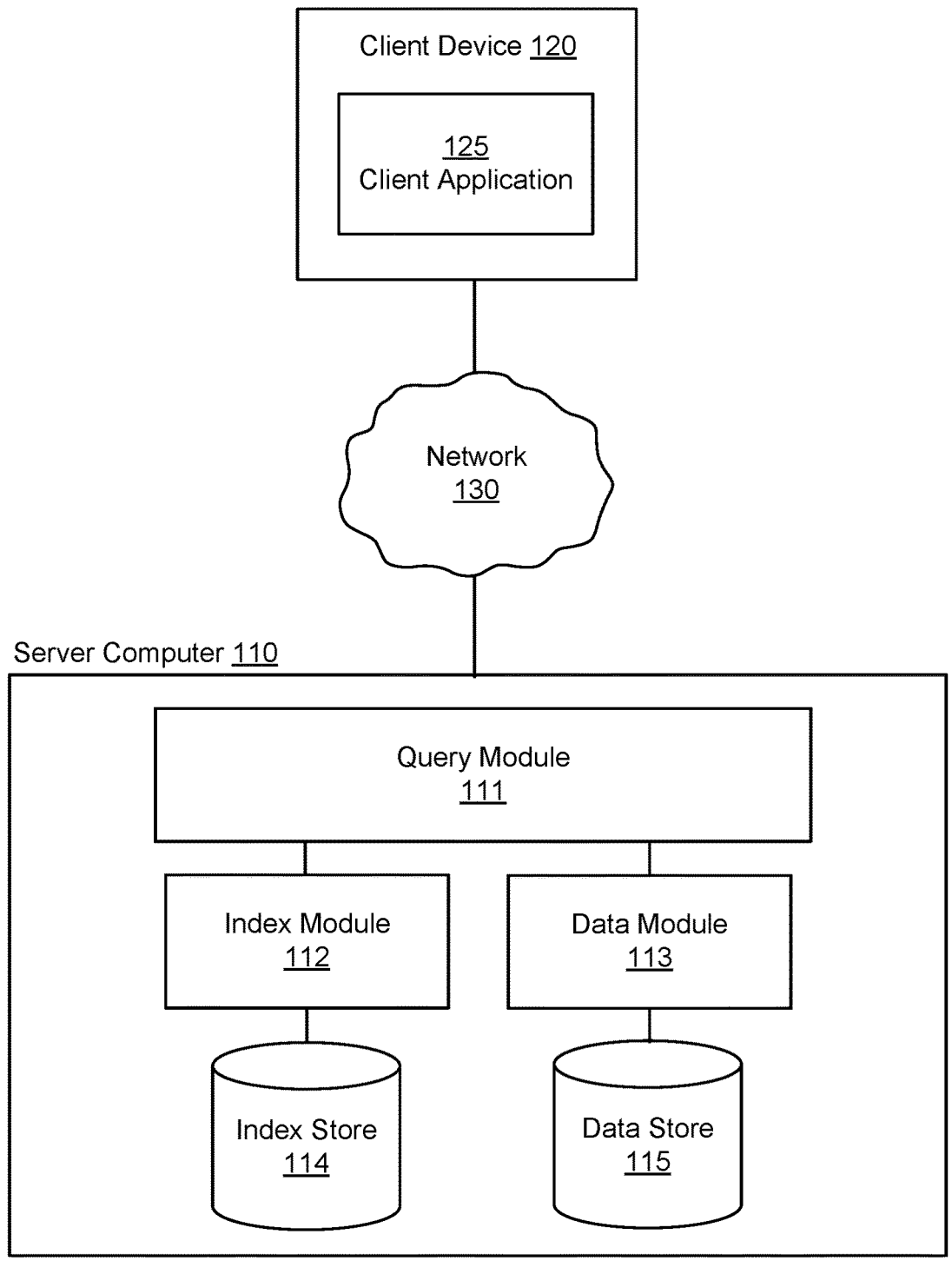
FIG. 1 is a block diagram of a document-oriented database system environment for performing optimized database queries, according to one embodiment.

The figures depict various embodiments for purposes of illustration only. One skilled in the art will readily recognize from the following discussion that alternative embodiments of the structures and methods illustrated herein may be employed without departing from the principles of the embodiments described herein.

The figures use like reference numerals to identify like elements. A letter after a reference numeral, such as "115a," indicates that the text refers specifically to the element having that particular reference numeral. A reference numeral in the text without a following letter, such as "115," refers to any or all of the elements in the figures bearing that reference numeral.

DETAILED DESCRIPTION

System Environment

FIG. 1 is a block diagram of a document-oriented database system 100 environment for performing optimized database queries, according to one embodiment. The system environment includes a server computer 110, a client device 120, and a network 130. Other embodiments may use more or less or different systems than those illustrated in FIG. 1. Functions of various modules and systems described herein can be implemented by other modules and/or systems than those described herein.

The server computer 110 receives and processes document-oriented database queries. The server computer 110 includes a query module 111, index module 112, data module 113, index store 114, and data store 115. The term database query, as used herein, refers to a request to access or manipulate data stored by one or more fields in a collection of documents in a document-oriented database. Fields are discussed in greater detail below with reference to the index module 112. In response to receiving a database query the server computer 110 retrieves the data requested in the query (e.g. stored in data store 115) and transmits the data over the network 130. The server computer 110 may be any computing device, including but not limited to: servers, racks, workstations, personal computers, general purpose computers, laptops, Internet appliances, wireless devices, wired devices, multi-processor systems, mini-computers, and the like. Although FIG. 1 shows a single element, the server computer 110 broadly represents one or multiple server computers, such as a server computer, and the server computer may be located in one or more physical locations. The server computer 110 also may represent one or more virtual computing instances that execute using one or more computers in a datacenter such as a virtual server farm.

The query module 111 receives and parses database queries in order to retrieve the data requested by the query from the data store 115. In particular, the query module 111 generates a query execution plan by parsing a received query. The term query execution plan (QEP), as used herein, refers to an ordered set of steps for accessing data stored in a database (e.g. data store 115). Based on the generated QEP, the query module 111 obtains query indexes from the index module 112 and then fetches the data corresponding to the obtained query indexes from the data module 113. In some embodiments, the query module 111 generates the QEP using a cost-based optimizer. Indexes are described below in relation to the index module 112.

The index module 112 generates indexes for data stored in the data store 115 and retrieves keys corresponding to data relevant to a received QEP included in the indexes stored in the index store 114. In particular, the index module 112 may generate indexes for one or more untyped fields storing data in the data store 115. The term field, as used herein, refers to an identifier of a group of data value that may be included in a collection of documents stored in the data store 115, where each document in the collection has one or more data values stored in association with a given field. For example, if the collection is "users," each user may have a "name" field which stores the relevant user's name, such as "Bailey." The term "untyped field," as used herein, refers to a field which can store data of multiple data types across different documents, such as strings, numbers, arrays, objects, etc. (e.g. JSON data types). In general, a field is untyped in a document-oriented database because a corresponding collection of documents stored in the database does not have a predefined schema for the stored documents.

The index module 112 provides the retrieved keys to other components of the server computer 110. Additionally, the index module 112 may store generated indexes in the index store 114. The term key, as used herein, refers to an identifier of one or more individual data values stored by a field in one or more documents in the database (e.g. a number, an object, a number in an array, etc.) and may be represented using an identifier such as a string, a number, a Uniform Resource Identifier (URI), or a path. An index, as used herein, refers to a data structure that improves the speed of data retrieval in response to a query by logically organizing keys associated with one or more fields. An example data structure representation of an index is a B+ Tree. The index module 112 may generate indexes in response to the sever computer 110 receiving new data for storage in data store 115 or receiving a request to generate or update an index for one or more keys.

The data module 113 receives a set of keys related to a query and fetches the data stored in data store 115 corresponding to the keys. The data module 113 may fetch documents containing the data requested by a received query stored in the data based on the set of keys. The documents may then be processed (e.g. by query module 111) in order to provide the specific data contained within the documents requested by the query. In other cases, the data module 113 may fetch the exact data requested by the query and provide the data to other components of the server computer 110.

The index module 112 stores indexes generated by the server computer 110 for data entries stored in the data store 115. In one embodiment, the index module 112 is integrated with the index store 114.

The data store 115 is a documented oriented database (e.g. a JSON, XML, or YAML database). In particular, the data store 115 stores collections of documents (i.e. collections), where each document in the collection includes a set of fields storing data values. For example, the data store 115 may include a collection of users, where each user is represented by a document that includes the fields: name, address, and age. A record, as used herein, is the set of values assigned to the fields of a document. For example, a user record might be: {name: Bailey, address: 123 California St., San Francisco, age: 23}. In one embodiment, the data store 115 is a JSON database. In this case, the data values stored in the data store 115 may be represented by any of the JSON scalar data types which include strings, numbers (e.g. integers, floating point values, etc.), Boolean values, and null values. The term scalar data, as used herein, refers to data consisting of a single value. Additionally, the data stored in the data store 115 may be represented by JSON objects and arrays, each of which may contain one or more scalar data values, arrays, or objects. A document stored by data store 115 may be part of a collection of documents, where each document in the collection includes the same fields.

The client device 120 sends database queries for data stored at server computer 110. In particular, a client application 125 running on client device 120 sends requests to retrieve or update data (e.g. database queries) to the server computer 110 over the network 130. The client application 125 then receives data in response to the request from the server computer 110 sent back over the network 130. The data received in response may indicate to the client application 125 that the request was successfully executed, and may additionally include data queried in the request. Example client devises include personal computers (PCs), mobile phones, additional server computers, etc. Examples of client application 125 include browser applications and video games. The client application 125 may communicate with the server computer 110 through an Application Programming Interface (API) or a query language. An example API the server computer 110 might provide is a Representation State Transfer (REST) API.

The server computer 110 and client device 120 shown in FIG. 1 can be executed using computing devices. A computing device can be a conventional computer system executing, for example, a Microsoft™ Windows™-compatible operating system (OS), Apple™ OS X, and/or a Linux distribution. A computing device can also be a client device having computer functionality, such as a personal digital assistant (PDA), mobile telephone, video game system, etc. The server computer 110 stores the software modules storing instructions for embodiments, for example the query module 111.

The interactions between the client device 120 and the server computer 110 are typically performed via a network 130, for example, via the Internet. In one embodiment, the network uses standard communications technologies and/or protocols. Example networking protocol include the transmission control protocol/Internet protocol (TCP/IP), the user datagram protocol (UDP), internet control message protocol (ICMP), etc. The data exchanged over the network can be represented using technologies and/or formats including JSON, the hypertext markup language (HTML), the extensible markup language (XML), etc. In another embodiment, the entities can use custom and/or dedicated data communications technologies instead of, or in addition to, the ones described above. The techniques disclosed herein can be used with any type of communication technology, so long as the communication technology supports receiving by the document-oriented database system 100 of web requests from a sender, for example, a client device 120 and transmitting of results obtained by processing the web request to the sender.

System Architecture

Figure 2:
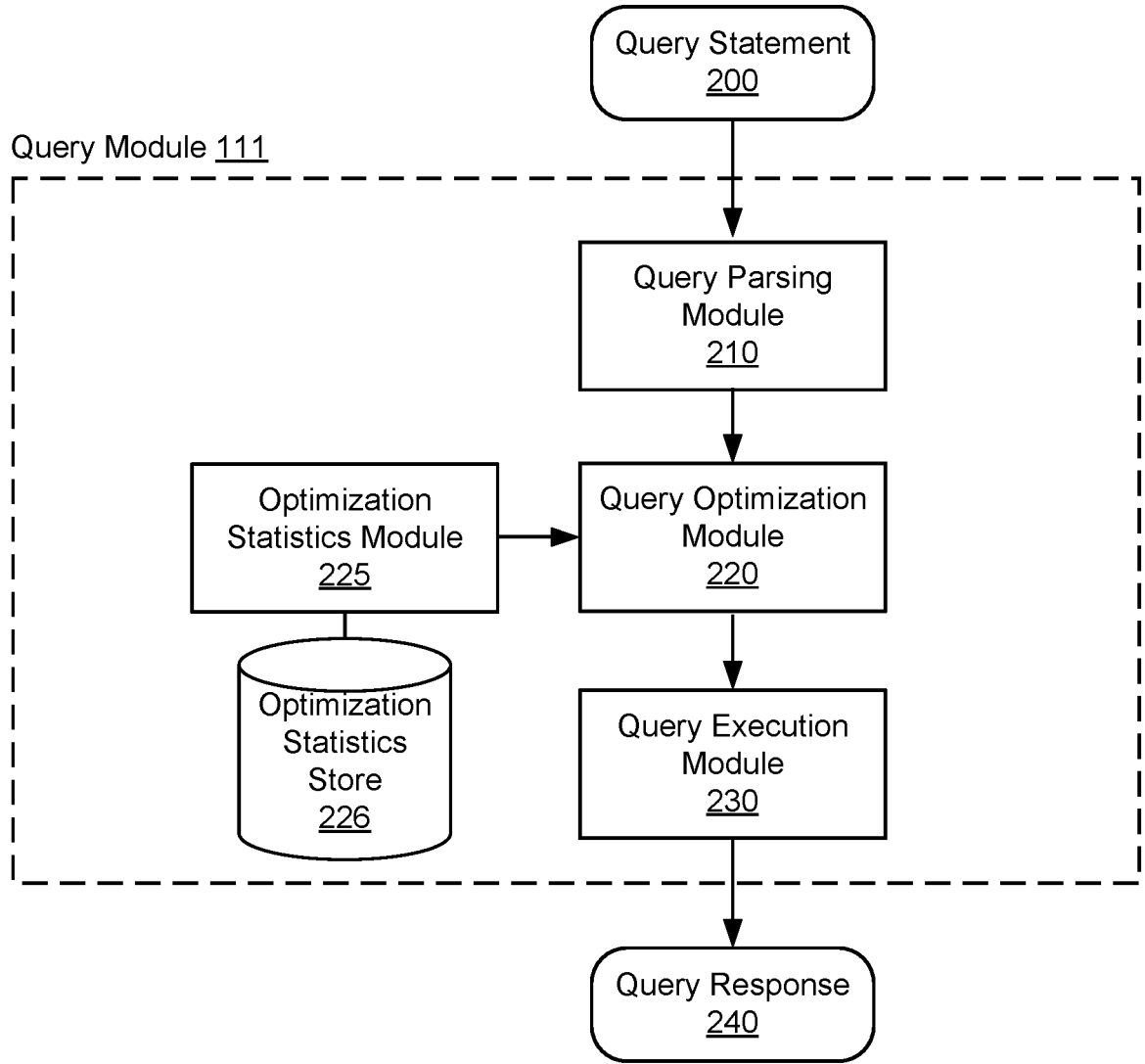
FIG. 2 is a block diagram illustrating the architecture and data flow of a query module for performing optimized document-oriented database queries, according to one embodiment.

FIG. 2 is a block diagram illustrating the architecture and data flow of the query module 111 for performing optimized JSON database queries, according to one embodiment. The query module 111 consists of a query parsing module 210, a query optimization module 220, an optimization statistics module 225, an optimization statistics store 226, and a query execution module 230. Other embodiments can have different and/or other components than the ones described here. Furthermore, the functionalities described herein can be distributed among the components in a different manner.

The query parsing module 210 receives and parses a query statement 200 in order to fetch or update data stored by one or more untyped fields requested by the query. The query parsing module 210 then provides a parsed representation of the query statement 200 to the query optimization module. The query statement 200 is a request to retrieve or manipulate (e.g. update) the data stored by one or more data fields in the documents of one or more collections contained in the data store 115. The query statement 200 may include one or more commands which specify the one or more fields, and additionally may include and one or more filters usable to select certain data values stored by the one or more fields. For example, the query statement 200 may request a set of user objects containing a field (e.g. user birthday) storing a particular value (e.g. February $10^{th}$). Example commands which may be included in the query statement are SELECT, JOIN, ORDER, INSERT, UPDATE, DELETE, MERGE, UPSERT, or other data manipulation statements. Example filters with may be included in the query statement are "is equal to," "is less than," "is greater than," "contains," etc. The query statement 200 may be a set of commands associated with a particular API or query language.

The query optimization module 220 receives a parsed query statement and generates a QEP in order to execute the commands on data in the data store 115 included in the query statement. In particular, the query optimization module 220 determines an optimal QEP from all logically equivalent QEP's for executing the parsed query statement using optimization statistics received from the optimization statistics module 225. For example, two QEPs may include filters on data that are logically equivalent, such as the filters "field value=X" and "field value includes X" The term optimal QEP, as used herein, refers to a QEP which minimizes the cost of execution, where cost is determined based on one or more metrics described in greater detail below. After generating the QEP, the query optimization module 220 provides the QEP to the query execution module 230. In one embodiment, each QEP is represented by an ordered sequence of operators, where each operator describes instructions for a specific operation on the indexes, keys, or data stored in the index store 114 or data store 115. For example, operators may fetch data values stored by a field using keys corresponding to those data values, scan indexes, scan keys included in indexes, join data across multiple documents in a collection, etc. In this case, the query optimization module 220 may determine the cost of individual operators based on the optimization statistics. The optimization statistics may include various statistics corresponding to the indexes, documents, and fields of a collection usable to determine the number of documents accessed by a step in the QEP.

The optimization statistics module 225 generates various statistics describing the data stored in the index store 114 and the data store 115 for use in selecting an optimal QEP. In particular, the optimization statistics module 225 may generate counts, averages, distributions and other statistical values for indexes, fields, and documents included in the collections of documents in data store 115. For example, the optimization statistics module 225 may determine statistics for data collections (i.e. collection statistics) in the data store 115 (e.g. the number of documents in the collection and average document size). As another example, the query execution module 230 may determine statistics for the index corresponding to one or more fields (i.e. index statistics) in the index store 114 (e.g. the number of keys included in the index or the number of unique documents in the collection including data values corresponding to the keys in the index). In one embodiment, the optimization statistics model 225 gathers statistics on the individual fields included in the documents of a collection in the data store 115 describing the distribution of data stored by the fields (i.e. distribution statistics). In particular, the optimization statistics model 225 may generate a plurality of histograms each corresponding to one type of scalar data stored by a field. Additionally, the optimization statistics model 225 may combine the individual histograms into a multi-histogram. The optimization statistics module 225 may store the collection statistics, index statistics, and distribution statistics in the optimization statistics store 226. Distribution statistics are discussed in detail below with reference to FIGS. 4, 5 and 7.

In some embodiments, the optimization statistics module 225 automatically updates the optimization statistics periodically (e.g. once a day or once a week). The optimization statistics module 225 may also update different sets of statistics at different rates. For example, collection statistics may be updated every day, while distribution statistics may be updated every week. In the same or different embodiment, statistics for particular data can be updated manually, such as with a command received from client device 120. For example, a command might request that the statistics associated with a particular collection are updated.

The query execution module 230 receives the QEP from the query optimization module 220 and performs the instructions encoded in the QEP. After performing the instructions, the query execution module 230 outputs a query response 240, which the server computer 110 further processes (e.g. sends to client device 120). The query execution module 230 may provide instructions to the index module 112 in order to fetch indexes or keys relevant to the data records specified in the QEP. Additionally, the query execution module 230 may provide instructions to the data module 113 for fetching or manipulating the data records specified in the QEP. In some embodiments, the query execution module 230 first retrieves one or more documents including the data specified in the QEP and then performs the operations on the retrieved documents encoded in the QEP. For example, if the QEP is a request for data, the query execution module 230 may filter the documents for the data specified in the QEP, aggregate the filtered data, sort the filtered data, and finally store the filtered data in the query response 240.

The query response 240 represents data generated or retrieved by the query module 111 in response to the query statement 200. For example, if the query statement 200 requests data in the data store 115, the query response 240 will include the requested data. Additionally, the query response 240 may include metadata describing the operations performed by the query module 111 in executing the query statement 200. For example, if the query statement 200 requested that some data in data store 115 be deleted, the query response 240 may convey whether the delete operation was successful or unsuccessful (e.g. the data could not be found).

Figure 3:
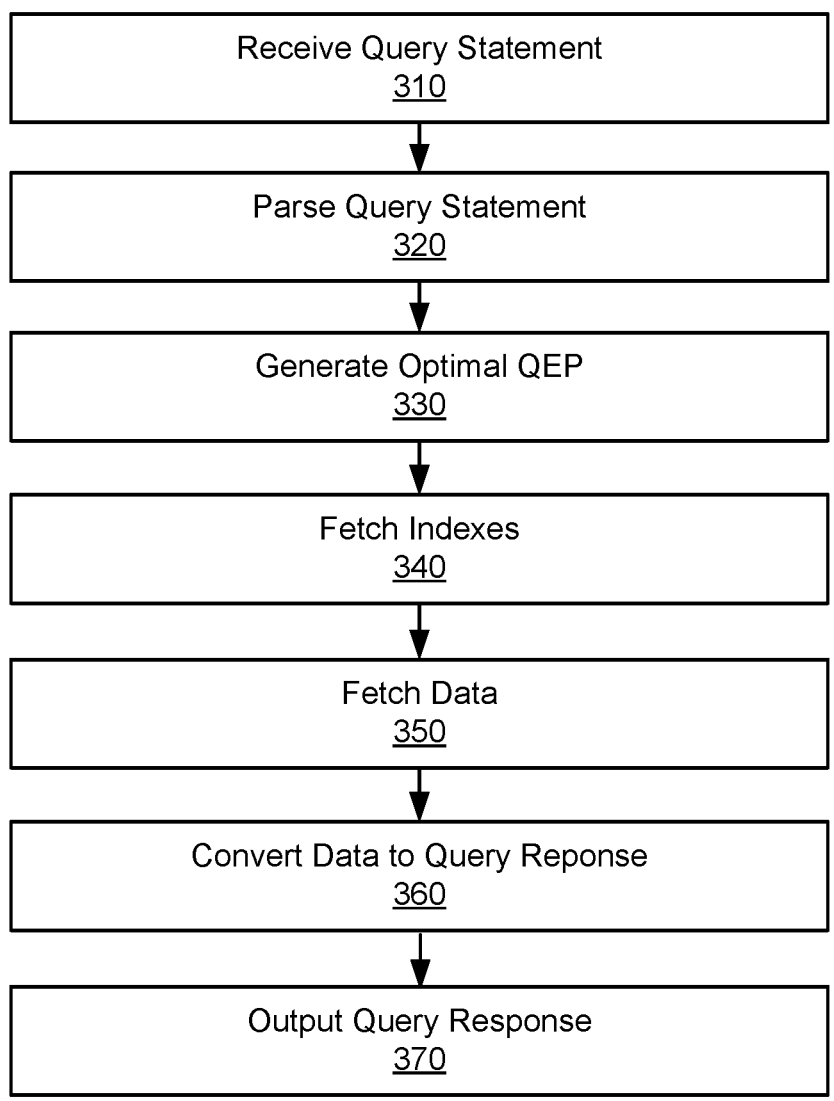
FIG. 3 is a flow chart illustrating a process for performing optimized document-oriented database queries by a document-oriented database system, according to an embodiment.

FIG. 3 is a flow chart illustrating a process 300 for performing optimized document-oriented database queries by the document-oriented database system 100, according to an embodiment. The process 300 begins with the document-oriented database system 100 receiving 310 a query statement directed at querying data in a document-oriented database stored by the document-oriented database system 100 (e.g. data store 115), such as the query statement 200. The document-oriented database system 100 parses 320 the received query statement in order to identify the set of steps implicit in the query statement (e.g. using the query parsing module 210). Based on the parsed query statement, the document-oriented database system 100 generates 330 an optimal QEP. For example, the query optimization module 220 may use optimization statistics provided by the optimization statistics module 225 to determine costs associated with various possible QEPs and select an optimal QEP from the possible QEPs. Having generated an optimal QEP, the document-oriented database system 100 fetches 340 indexes corresponding to the data being queried based on the QEP. For example, the query execution module 230 may retrieve indexes from the index store 114 corresponding to fields specified in the optimal QEP using the index module 112. Using the retrieved indexes and the optimal QEP, the document-oriented database system 100 fetches 350 the data (e.g. documents). For example, the query execution module 230 may fetch the data from the data store 115 using the data module 113. The document-oriented database system may also perform additional operations after fetching the data, such as updating, deleting, combining, or otherwise manipulating the data. After fetching and processing the data, the document-oriented database system 100 converts 360 the data to a query response and finally outputs 370 the query response to the system or device which submitted the query statement. For example, the query execution module 230 may output the query response 240 to client device 120.

Other entities may perform some or all the steps of the process 300 in other embodiments. Likewise, embodiments may include different and/or additional steps, or perform the steps in different orders.

Distribution Statistics Collection

In various embodiments, the optimization statistics module 225 periodically samples data stored in data store 115 in order to generate, update, and store distribution statistics corresponding to a collection of documents. The optimization statistics module 225 may receive an update request to generate or otherwise modify distributions statistics which specify a particular collection of documents in data store 115 (e.g. a statistics update command). The update request may additionally specify untyped fields included in the documents of the collection or one or more indexes corresponding to untyped fields included in the documents of the collection. As described above in relation to the optimization statistics module 225, the distribution statistics may include multi-histograms comprising multiple histograms corresponding to the one or more scalar data types of the data stored by the given untyped field. In addition to distribution statistics, the optimization statistics module 225 may determine collection statistics and index statistics for the collection and one or more indexes specified in the update request.

The document-oriented database system assigns an order to various types that untyped variables can take. For example, all integer values may be considered less than string values, all string values may be considered less than boolean values, and so on. The multi-histogram arranges the various histograms in the same order in which the types are ordered. Accordingly, if all integer values are considered less than string values, the histogram of integers comes before the histogram of strings in the multi-histogram. In general, if the types are arranged in an order $T1<T2<T3 \ldots <Tn$ and the type T1 has histogram H1, type T2 has histogram H2, type T3 has histogram H3, and so on, the multi-histogram arranges the histograms in the order H1, H2, H3, Hn. The document-oriented database system uses the assigned order of types to process queries based on untyped variables and uses the multi-histogram to determining statistics describing the documents corresponding to the untyped variables for performing cost-based optimization of queries.

In some embodiments, the optimization statistics module 225 may generate histograms by combining one or more histogram bins, where each histogram bin describes data values of a given scalar type in a value range (e.g. integers from 1 to 100). In this case, the optimization statistics module 225 may determine a resolution for the histograms, where the resolution defines the number of histogram bins included in a given histogram. In one embodiment, the resolution is specified as a percentage of documents. For example, a resolution of 25% means a histogram bin represents the data of a given scalar type stored by an untyped field in approximately 25% of the documents in the collection, and the entire histogram consists of four histogram bins. The resolution may additionally be specified in the received update request. Furthermore, the optimization statistics module 225 may use a default resolution when no resolution is specified, or to enforce a minimum or maximum resolution (e.g. histogram bins including at least 0.02% of the documents and no more than 5%).

The optimization statistics module 225 may generate the histograms by sampling data stored in the collection of documents in the data store 115. In this case, the optimization statistics module 225 may receive an update request including a sample size, where the sample size specifies a number of documents to sample from (e.g. 1000 documents in a collection of 100,000 documents). The optimization statistics module 225 may generate the histogram bins based on the resolution and the sample size. For example, the optimization statistics module 225 may randomly fetch a number of documents equivalent to the sample size and determine the histogram bins based on the values stored by a given untyped field in the fetched documents. As a simple example, if a histogram corresponding to integer values is being created on an untyped field "user age," the resolution is 25%, and the sample size is 8, the optimization statistics module 225 may fetch documents with user age values 15, 15, 16, 18, 20, 21, 22, and 30. In this case, a first histogram bin may describe the value range 15-15, a second histogram bin may describe the value range 16-18, a third histogram bin may describe the value range 20-21, and a fourth histogram bin may describe the value range 22-30. The optimization statistics module 225 may use a default sample size if no sample size is specified, or to enforce a minimum or maximum sample size (e.g. sampling at least 0.01% of the documents and no more than 50%). In one embodiment, the optimization statistics module 225 may determine a sample size based on a confidence level (e.g. using a Kolmogorov-Smirnov test) and compare the determined sample size with a received sample size and select one or the other based on a criterion. For example, the optimization statistics module 225 may always select the largest sample size.

A histogram bin may include various statistics describing the data of a given scalar type in a particular range. In particular, a histogram bin may include a size, such as the fraction or the number of documents the bin represents in a collection (e.g. based on the resolution), the fraction or the number of unique data values of a given scalar type stored by the untyped field in the range corresponding to the histogram bin relative to the entire histogram, and the maximum value of the given scalar type in the range stored by the untyped field. For example, continuing with the simple example above, the first histogram bin represents ¼ of the documents, includes ⅐ of the unique values, and has a max value of 15. As a further example, the second histogram bin similarly represents ¼ of the documents, includes ⅖ of the unique values, and has a max value of 18. The fraction of unique data values may be estimated by dividing the number of unique values in the range that the histogram bin represents by the total number of documents in the collection. For example, if the collection contains 90 documents and a histogram bin represents integers from 1-30 (i.e. 30 unique values), then the fraction of unique data values may be 30/90=⅓. In alternative embodiments, a histogram bin may store analogous values to those described above (e.g. the total number of unique values of the given type stored by the field) or may store additional values describing other features of the data.

In some embodiments, the optimization statistics module 225 generates one or more overflow bins when sampling documents in a collection. Overflow bins may represent data values which meet certain criteria specified by the optimization statistics module 225. In particular, if a certain data value is included in a threshold percentage of documents sampled from a collection (e.g. 2.5% of the documents), the optimization statistics module 225 may create an overflow bin for the data value. For example, continuing with the simple example above, the value 15 is included in 25% of the sampled documents. If the overflow bin threshold is 20%, then the optimization statistics module 225 may create an overflow bin specifically for the value 15. Overflow bins may include a size as described above in relation to histogram bins, and may additionally specify the one or more values the overflow bin represents. Additionally, the optimization statistics module 225 may generate overflow bins for values of certain special scalar types. For example, the optimization statistics module 225 may create overflow bins for the unary JSON values MISSING and NULL or the binary Boolean values TRUE/FALSE.

In some embodiments, the untyped field specified in the received update request stores arrays in one or more documents in a collection (i.e. an array field). The arrays may include one or more fields storing additional values (e.g. scalar values, other arrays, objects). In this case, the optimization statistics module 225 may generate histograms for each scalar value stored in the arrays. For example, if an array stores integer values, the integers in the array would be represented in a histogram corresponding to integers. Similarly, if an array stores strings, the strings in the array would be represented in a histogram corresponding to strings. If the untyped field stores scalar values in some documents and arrays in some documents, the optimization statistics module 225 may generate histograms which describe both the individual scalar values and the scalar values in the arrays of a certain type. For example, the untyped field "user age" may store the integer 20 in one document and the array of integers [21, 24, 26] in another document, and the optimization statistics module 225 may generate an integer histogram describing a distribution that includes both the individual scalar values and the array scalar values (i.e. 20, 21, 24, and 26).

In some embodiments, the optimization statistics module 225 determines and stores one or more average array sizes (i.e. number of values in the array) for the arrays stored by an untyped field. In one embodiment, the optimization statistics module 225 stores an average size of all arrays stored by the untyped field. In the same or different embodiment, the optimization statistics module 225 stores an average array size for one or more histogram bins. In this case, the optimization statistics module 225 determines the average size of arrays which include a value in the range of a given histogram bin. For example, arrays stored by the untyped field which include an integer value in the range 1-10 may have an average size of 5. The optimization statistics module 225 may additionally determine the average number of unique values in arrays stored by the untyped field in any of the manners described above. Use of the average array size for determining the cost of operators including filters on arrays will be discussed in greater detail below with reference to FIG. 4.

In some embodiments, the optimization statistics module 225 determines the number of occurrences of a given value in a given array stored by the untyped field. For example, the untyped field may store the array [2, 2, 2, 5, 5], and the optimization statistics module 225 may determine that the array stores three occurrences of 2 and two occurrences of 5. Furthermore, the optimization statistics module 225 may determine the average number of occurrences of values in arrays for a given histogram bin. For example, arrays stored by the untyped field including integers in the range 1-10 may include an average of 2 occurrences of those integers. Use of the number of occurrences of values in an array for determining the cost of operators including filters on arrays will be discussed in greater detail below with reference to FIG. 4.

In some embodiments, the untyped field specified in the received update request stores objects in one or more documents in a collection. The objects may include one or more fields storing additional values (e.g. scalar values, arrays, other objects). In this case, the optimization statistics module 225 may generate histograms for each scalar value stored by fields in the objects, similar to what is described above in relation to arrays.

In some embodiments, the optimization statistics module 225 combines the histograms generated for one or more scalar types using the methods described above into a multi-histogram. The optimization statistics module 225 may generate histograms only for the scalar types which the untyped field stores (e.g. only integer and string histograms), or may generate histograms for each type in a set of types (e.g. integers, floats, doubles, strings, arrays, objects, MISSING, NULL, TRUE, FALSE, etc.). In the latter case, the histograms may indicate that the untyped field does not store any values of the corresponding type (e.g. each histogram bin in the histogram has a size of 0).

In some embodiments, the optimization statistics module 225 generates statistics update requests based on the creation of indexes for the documents in a collection. For example, the index module 112 may create an index for an untyped field including keys corresponding to all of the scalar values stored by the untyped field (i.e. a key for each document). In this case, the optimization statistics module 225 may generate distribution statistics describing all data stored by the untyped field. As another example, the index module 112 may create an index for an untyped field including keys corresponding to the unique values stored by the untyped field (i.e. a key for each unique value). In this case, the optimization statistics module 225 may generate distribution statistics describing only unique values stored by the untyped field. In additional examples, the index module 112 may create an index on individual scalar values in arrays or objects stored by the untyped field, and the optimization statistics module 225 may similarly collect statistics corresponding to the created indexes.

Query Optimization

Figure 4:
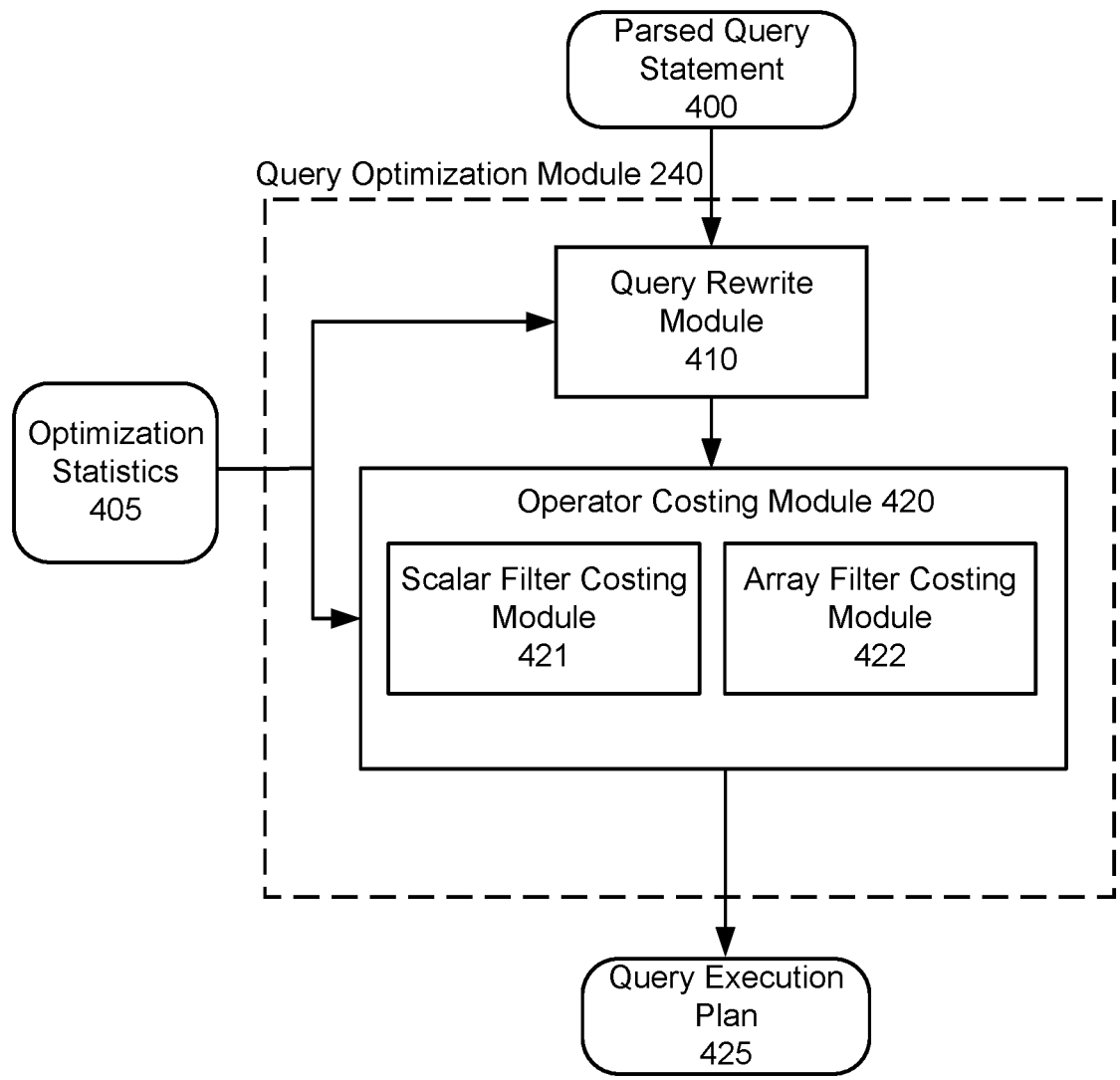
FIG. 4 is a block diagram illustrating the architecture and data flow of a cost-based query optimization module, according to one embodiment.

FIG. 4 is a block diagram illustrating the architecture and data flow of the query optimization module 220, according to an embodiment. The query optimization module 220 consists of a query rewrite module 410 and an operator costing module 420. The operator costing module 420 additionally includes a scalar filter costing module 421 and an array filter costing module 422. The various modules included in the query optimization module 220 receive optimization statistics 405 (e.g. from optimization statistics module 225) describing the data in data store 115. Other embodiments can have different and/or other components than the ones described here. Furthermore, the functionalities described herein can be distributed among the components in a different manner.

The query rewrite module 410 receives a parsed query statement 400 (e.g. derived from query statement 200) directed at querying one or more untyped fields and rewrites the parsed query statement 400 to produce an optimal equivalent parsed query statement. In one embodiment, the query rewrite module 410 rewrites the parsed query statement 400 based on a set of rules. For example, applying filters to query data stored by two fields A and B may logically be done in any order to achieve the same result, but there may be a performance difference depending on which of fields A and B are queried using the respective filters first. In this case, the query rewrite module 410 includes rules corresponding to the filters used to filter A and B, or corresponding to the fields A and B themselves, designed to select a query order with the best performance.

In the same or different embodiment, the query rewrite module 410 performs a cost-based rewrite of the parsed query statement 400. For example, when querying the two fields A and B the query rewrite module 410 may determine the cost of applying filter A to field A first and the cost of applying filter B to field B first. Based on the determined costs, the query rewrite module 410 rewrites the parsed query statement 400 to apply filter A to field A and filter B to field B in the order with the lowest cost. The query rewrite module 410 may determine costs associated with commands included in the parsed query statement 400 based on the optimization statistics 405. Furthermore, the query rewrite module 410 may rewrite the parsed query statement 400 using a combination of a rule based and cost-based approach. For example, commands for which system performance is highly dependent on the state of the database may be rewritten based on determined costs, while commands with performance that is relatively unaffected by the state of the database may be rewritten based on predefined rules.

The operator costing module 420 receives the rewritten parsed query statement 400 from the query rewrite module 410 and determines a lowest cost QEP 425 (i.e. the optimal QEP) from all possible QEPs for executing the parsed query statement 400. The operator costing module 420 constructs the QEP from a set of QEP operators, where the operator costing module 420 may determine the cost of one or more QEP operator of the set of QEP operators based on the optimization statistics 405. The query optimization module 220 may output the QEP 425 to be used in executing the parsed query statement 400. The operator costing module 420 may determine the cost of a given operator based on the number of documents it accesses (i.e. the operator cardinality). In particular, the operator costing module 420 may determine costs associated with one more untyped data fields referenced by an operator using the scalar filter costing module 421, the array filter costing module 422, or both. The term cardinality, as used herein, refers to the number of unique documents which a database element (e.g. collection, index, operator, filter, etc.) of a document-oriented database or a document-oriented database query references or accesses. For example, a collection's cardinality may be the total number of documents in the collection. As another example, an index's cardinality may be the number of unique documents referenced by the keys in the index. As a further example, an operator's cardinality may be the number of documents which will be accessed by the operator. A filter's cardinality may be the number of documents with values matching the filters (e.g. all documents where the field user age is 5). Additionally, the cardinality of a database element may be determined based on the element's selectivity, where the selectivity indicates the percentage of unique documents relative to the total number of documents in the collection (i.e. the collection's cardinality).

In various embodiments, the operator costing module 420 may additionally determine the cost of a given operator based on other behavior of the operator, the time-space complexity of the operator, the memory space requirements of the operator, the I/O requirements of the operator, and/or additional features of the operator. For example, the operator costing module 420 may determine the cost-based on the number of documents the operator processes, the number of fields in the documents of a collection referenced by the operator, the number of different data types of data stored by a given field referenced by the operator, the number of distinct values in the documents of a collection referenced by the operator, the filters included in the operator, the aggregation effects of the operator, or any combination thereof.

In one embodiment, the operator costing module 420 iteratively generates the lowest cost QEP. In this case, the operator costing module 420 may determine an order in which the steps corresponding to the parsed query statement 400 occur. Proceeding in order, the operator costing module 420 may identify the set of possible operators which accomplish an individual step in the rewritten parsed query statement 400. In this case, the operator costing module 420 may determine the cost of one or more identified operator for the step based at least in part on the optimization statistics 405. The query optimization module 220 may select the operator with the lowest cost for the step before proceeding to perform the same on the next step in the order. In another embodiment, the operator costing module 420 may generate the QEP 425 by identifying all possible operators for executing each step in the parsed query statement 400 and determine the overall combination of operators which provides the lowest cost QEP 425. In this case, the operator costing module 420 may construct the QEP 425 such that the combined operator costs are minimized, while the cost of individual operators may not be minimized. Furthermore, the operator costing module 420 may include a set of predefined rules for how operators are combined to form the QEP 425.

The scalar filter costing module 421 determines costs for operators which reference untyped fields storing scalar values of one or more types. The operators may also include one or more filters applied to the referenced scalar values. For example, an operator may correspond to a fetch operation for documents with an untyped field "user name" where the user name is "Bob." As another example, an operator may correspond to a fetch operation for documents with an untyped field "user age" where the user age ranges from 20 to 30. As still another example, an operator may correspond to a fetch operation for documents with an untyped field for data of multiple types, such as documents with a "user age" field storing users ages of 20 and "twenty."

In some embodiments, the scalar filter costing module 421 uses the optimization statistics 405 to determine costs for operators. In particular, the scalar filter costing module 421 may use distributions statistics included in the optimization statistics 405 to determine or estimate the operator cardinality. For example, if the operator corresponds to a fetch operation for documents in a "user" collection with a "user age" field, the scalar filter costing module 421 may use a multi-histogram included in the optimization statistics for the collection corresponding to the "user age" field. If the operator includes a filter specifying documents where the "user age" field stores users ages of 20, the scalar filter costing module 421 may use the histogram corresponding to data of type integer in the multi-histogram. Furthermore, the scalar filter costing module 421 may identify the histogram bin describing the range of integers that includes 20, and use the information included in the histogram bin to estimate how many documents the filter will access. The scalar filter costing module 421 may estimate the operator cardinality using the following formula:

$$\text{number\_accessed\_documents\_scalar} = \text{bin\_size} \times \text{bin\_fraction\_unique\_values} \times \text{total\_documents}$$

Where number_accessed_documents_scalar is the estimated number of documents accessed by a filter on one or more scalar values included with an operator (i.e. the operator cardinality), bin_size is the percentage of documents represented by the corresponding histogram bin, bin_fraction_unique_values is the percentage of unique values represented by the corresponding histogram bin relative to all unique values stored by the field, and total_documents is the total number of documents in the collection. Using this formula, if the histogram bin of an untyped field corresponding to 20 has a size of ½ of the documents in the collection and describes a range with ⅓ of the unique values stored by the untyped field, and there are 90 total documents in the collection, then the scalar filter costing module 421 may determine that the estimated number of documents accessed by the filter is 15 (i.e. ½×⅓×90). In other embodiments analogous values may be stored or derived (e.g. the total number of unique values stored by the field) to perform equivalent calculations. In still other embodiments, the scalar filter costing module 421 may precisely determine the number of documents which the operator will access. The scalar filter costing module 421 may process the determined or estimated number of documents accessed by the operator to determine a corresponding cost, or may instead provide the determined or estimated number of documents accessed by the operator to other components of the operator costing module 420 to factor in to an overall cost for the operator.

In an embodiment, the query is a range query, a range query including a filter that describes a range of values stored by an untyped field. In this case, the scalar filter costing module 421 may determine an estimated number of documents accessed by the filter (i.e. the filter cardinality) for each value in the range of values using the multi-histogram in the same manner as described above. The range may have a start value and an end value such that the start value has a type T1 whereas the end value has a type T2 distinct from T1. Accordingly, the scalar filter costing module 421 may access a histogram bin b1 corresponding to the start value and a histogram bin b2 corresponding to the end value. The histogram bin b1 belongs to a histogram h1 for type T1 and histogram bin b2 belongs to histogram h2 for type T2 within the multi-histogram. Since the bins of the multi-histogram are ordered, the scalar filter costing module 421 may use all the bins between b1 and b2 in the multi-histogram for determining the statistics for optimizing the range query.

In addition to determining the cost of operators which specify untyped fields storing scalar values, the scalar filter costing module 421 may additionally be used to cost operators that specify untyped fields that store objects (e.g. JSON objects). In some embodiments, the indexes corresponding to an untyped field which store objects includes a unique key for each field within each object stored by the untyped field. In this case, the same formula described above in relation to the scalar filter costing module 421 can be used to estimate the number of documents accessed by an operator that includes a filter on one or more objects.

The array filter costing module 422 determines costs for operators which reference untyped fields that store array values (i.e. an array field). Similar to the scalar filter costing module 421, the array filter costing module 422 may use distribution statistics included in the optimization statistics 405 to determine or estimate the number of documents which will be accessed by an operator. The array filter costing module 422 may additionally account for redundant values stored in the arrays which are represented in the multi-histogram when determining or estimating the number of documents which will be accessed by the operator. In particular, the index module 112 may store an index associated with the untyped field including N keys corresponding to an array, where each key in the N keys corresponds to one of N unique values in the array. Prior to executing the operator as part of the QEP, the query module 111 may perform a distinct operation in order exclude redundant keys when fetching documents corresponding to the operator (e.g. only use 1 of the N keys to fetch the document including the array). However, the distribution statistics may account for each of the scalar values in an array (e.g. all instances of the N unique values), which may be collected using the methods described above in relation to the optimization statistics module 225. Additionally, the total_documents is not equivalent to the number of keys as it is in the case described above in relation to the scalar filter costing module 421. As a way to account for the redundant scalar values in the arrays in estimating the number of documents accessed by the operator, the array filter costing module 422 may use statistics describing the indexes corresponding to the array field to estimate the number of documents accessed by a filter on values stored by the array field. For example, the array filter costing module 42251 may perform the estimate using the following formula:

$$\text{number\_accessed\_documents\_array} = \frac{(\text{histogram\_estimate} \times \text{unique\_index\_keys})}{\text{average\_array\_size}}$$

Where number_accessed_documents_array is the estimated number of documents accessed by a filter on values in one or more arrays included with an operator, histogram_estimate is the estimated percentage of documents the operator will access based on the histogram (i.e. the estimated selectivity based on the histogram), unique_index_keys is the number of unique keys in the index corresponding to the array field (e.g. the number of distinct arrays corresponding to the index keys), and average_array_size is the average total or unique number of scalar values (depending on the use case) in arrays stored by the array field. In other embodiments, the array filter costing module 422 may precisely determine the number of documents which the operator will access. The array filter costing module 422 may process the determined or estimated number of documents accessed by the operator to determine a corresponding cost, or may instead provide the determined or estimated number of documents accessed by the operator to other components of the operator costing module 420 to factor in to an overall cost for the operator.

Similar to the scalar filter costing module 421, the filter may specify a range of values included in arrays stored by the array field. In this case, the array filter costing module 422 may determine an estimated number of documents accessed by the filter (i.e. the filter cardinality) for each value in the range of values using the multi-histogram in the same manner as described above in relation to the scalar filter costing module 421.

The scalar filter costing module 421 may determine the histogram_estimate (i.e. the operator selectivity) using histogram_estimate=bin_size×bin_fraction_unique_values. Using this formula as an example, an operator may include a filter specifying an array stored by an untyped field including the scalar value 20. In this case, if the histogram bin corresponding to 20 has a size of ½ of the documents in the collection and describes a range with ⅓ of the unique values stored by the untyped field, an index corresponding to the untyped field includes 90 unique keys, and the average array size in the collection is 3, then the array filter costing module 422 may determine that estimated number of documents accessed by the filter is 5 (i.e. (½×⅓×90)/3)). Additionally, the array filter costing module 422 may estimate the number of documents accessed by the operator more accurately by using the average array size corresponding to a particular histogram bin instead of the overall average array size. Similarly, the array filter costing module 422 may estimate the number of documents accessed by the operator more accurately by using the number of occurrences of the scalar values specified by the filter (e.g. 20), or an average number of occurrences, in place of the overall average array size included in the optimization statistics 405.

In addition to determining the cost of operators which specify untyped fields storing arrays including scalar values, the array filter costing module 422 may additionally be used to cost operators that specify untyped fields that store arrays including objects (e.g. JSON objects). As described above in relation to the scalar filter costing module 421, in some embodiments, the indexes corresponding to an untyped field which store arrays including objects includes a unique key for each field within each object in the arrays stored by the untyped field. In this case, the formula described above in relation to the array filter costing module 422 can be used to estimate the number of documents accessed by an operator that includes a filter on one or more objects included in arrays.

In some embodiments, the arrays stored in documents of the document-oriented database system 100 include values of a single data type. For example, document-oriented database system 100 may require array fields to be associated with a single data type (e.g. an integer array field, a string array field, etc.). In this case, the array filter costing module 422 may use a single histogram corresponding to the data type of the array field to determine the number of documents accessed by the filter, rather than a multi-histogram Furthermore, optimization statistics module 225 may not generate multi-histograms, but instead generate individual histograms corresponding to each data type of values stored by array fields in a collection.

Optimal QEP for Untyped Fields

Figure 5:
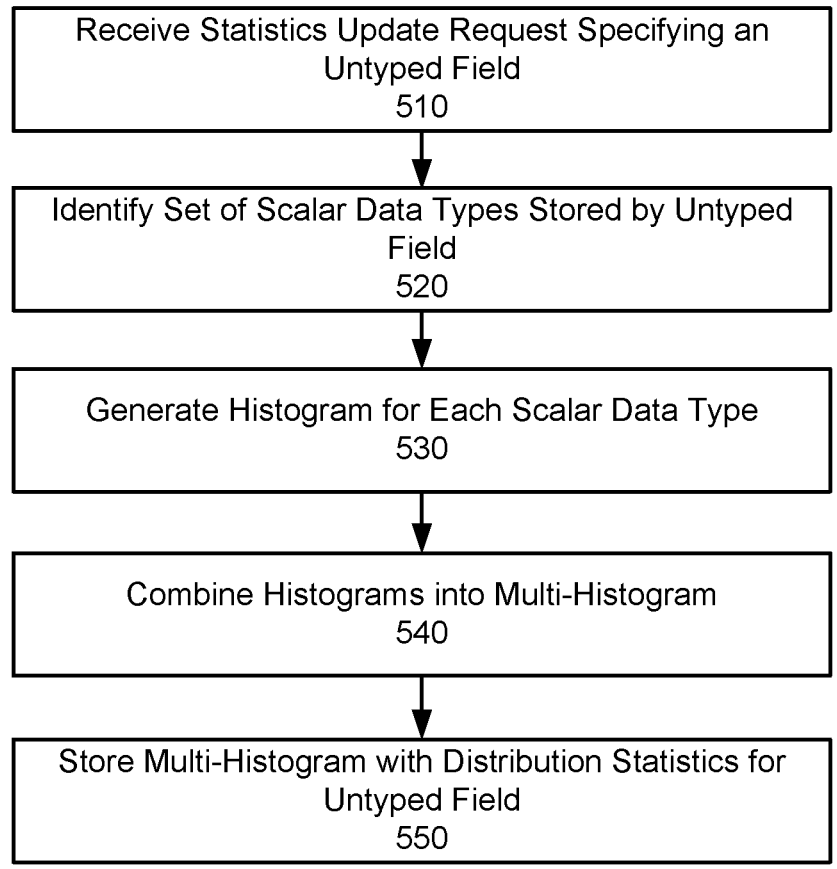
FIG. 5 is a flow chart illustrating a process for generating a multi-histogram corresponding to an untyped field by a document-oriented database system, according to an embodiment.

FIG. 5 is a flow chart illustrating a process 500 for generating a multi-histogram corresponding to an untyped field by the document-oriented database system 100, according to an embodiment. Process 500 begins with the document-oriented database system 100 receives 510 a statistics update request specifying an untyped field in a collection of documents stored in a document-oriented database (e.g. data store 115). The document-oriented database system 100 identifies 520 a set of scalar data types stored by the untyped field. For example, the optimization statistics module 225 may identify the scalar types which the untyped field is configured to store (e.g. all JSON data types), or may identify the scalar types which the untyped field is currently storing (e.g. limiting to integers and strings). The document-oriented database system 100 then generates 530 a histogram corresponding to each scalar data type in the set of scalar data types, where the histogram describes the distribution of the data stored by the untyped field of the corresponding scalar data type. From the individual histograms, the document-oriented database system 100 combines 540 the histograms into a multi-histogram, and finally stores 550 the multi-histogram in association with distribution statistics for the untyped field. For example, optimization statistics module 225 may store the multi-histogram in the optimization statistics store 226. Furthermore, the document-oriented database system 100 may also determine and store collection statistics or index statistics corresponding to the untyped field (e.g. collection statistics for the collection of documents including the untyped field or index statistics for one or more indexes corresponding to the untyped field).

Figure 6:
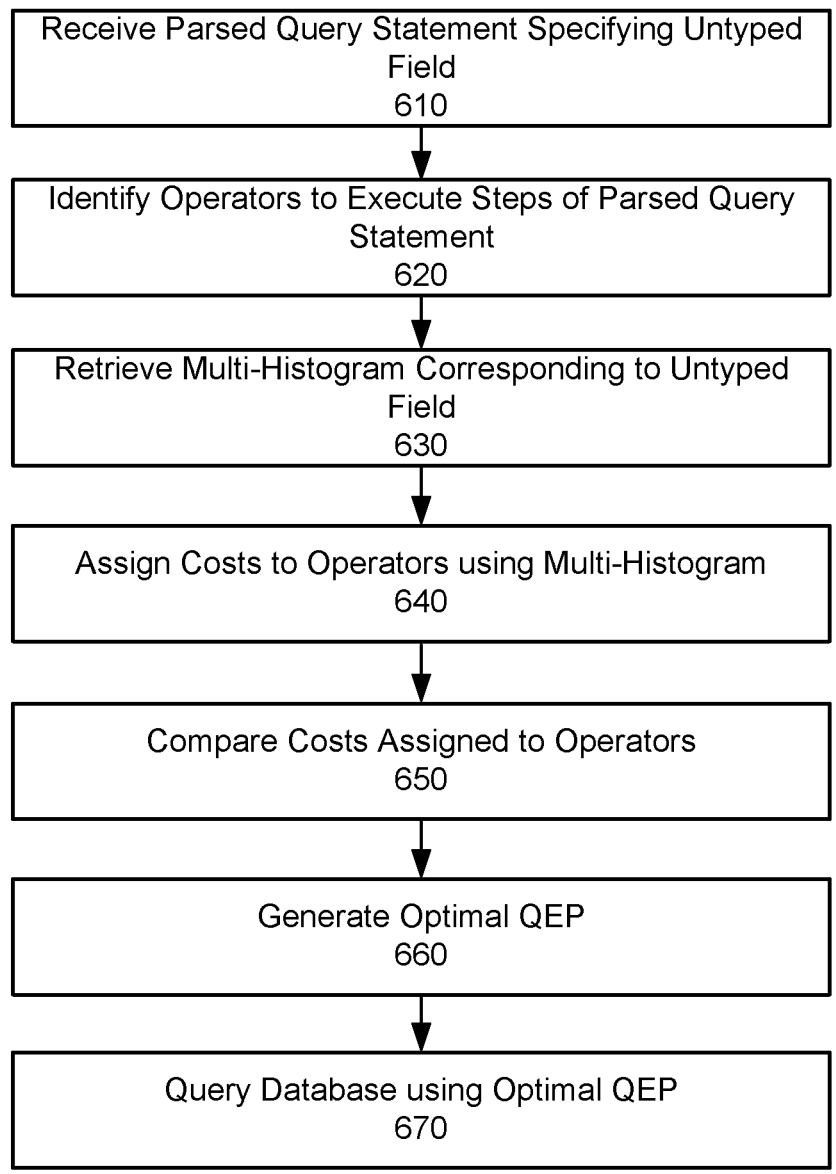
FIG. 6 is a flow chart illustrating a process for generating an optimal query execution plan to query an untyped field by a document-oriented database system, according to an embodiment.

FIG. 6 is a flow chart illustrating a process 600 for generating an optimal query execution plan to query an untyped field by the document-oriented database system 100, according to an embodiment. Process 600 begins with the document-oriented database system 100 receiving 610 a parsed query statement specifying an untyped field, where the parsed query statement comprises a set of steps for executing the query. For example, the query parsing module 210 may parse a query statement 200 received from a client device 120, and provide the parsed query statement 400 to the query optimization module 220. Furthermore, the query optimization module 220 may rewrite the parsed query statement 400. The document-oriented database system 100 identifies 620 operators usable to execute steps of the received parsed query statement. For example, the operator may be a fetch on an untyped field including a filter (e.g. fetch documents where user age=20). In order to assign costs to the identified operators, the document-oriented database system 100 retrieves 630 a multi-histogram corresponding to the untyped field stored by the document-oriented database system 100. The multi-histogram may have been generated and stored previously using a statistics update request, as described above in relation to FIG. 5. Additionally, the document-oriented database system 100 may generate the multi-histogram in response to receiving the parsed query statement, and may also use the process described above in relation to FIG. 5.

For each step included in the parsed query statement, the document-oriented database system 100 assigns 640 costs to one or more identified operators for the step using the multi-histogram. For example, the operator costing module 420 may using the scalar filter costing module 421 to determine or estimate the number of documents in the collection including the untyped field the operator will access. The document-oriented database system 100 compares 650 the costs assigned to the one or more operators and, based on the comparison, generates 660 an optimal QEP by selecting an operator for each step included in the parsed query statement. For example, the operator costing module 420 may determine an execution order for the steps and select operators for each step iteratively, such as by assigning costs to all identified operators for a single step, selecting the lowest cost operator for the step, and then proceeding to do the same for the next step, etc. Finally, the document-oriented database system 100 queries 670 the database using the generated optimal QEP.

Other entities may perform some or all the steps of the processes 500 and 600 in other embodiments. Likewise, embodiments may include different and/or additional steps, or perform the steps in different orders.

Optimal QEP for Array Fields

Figure 7:
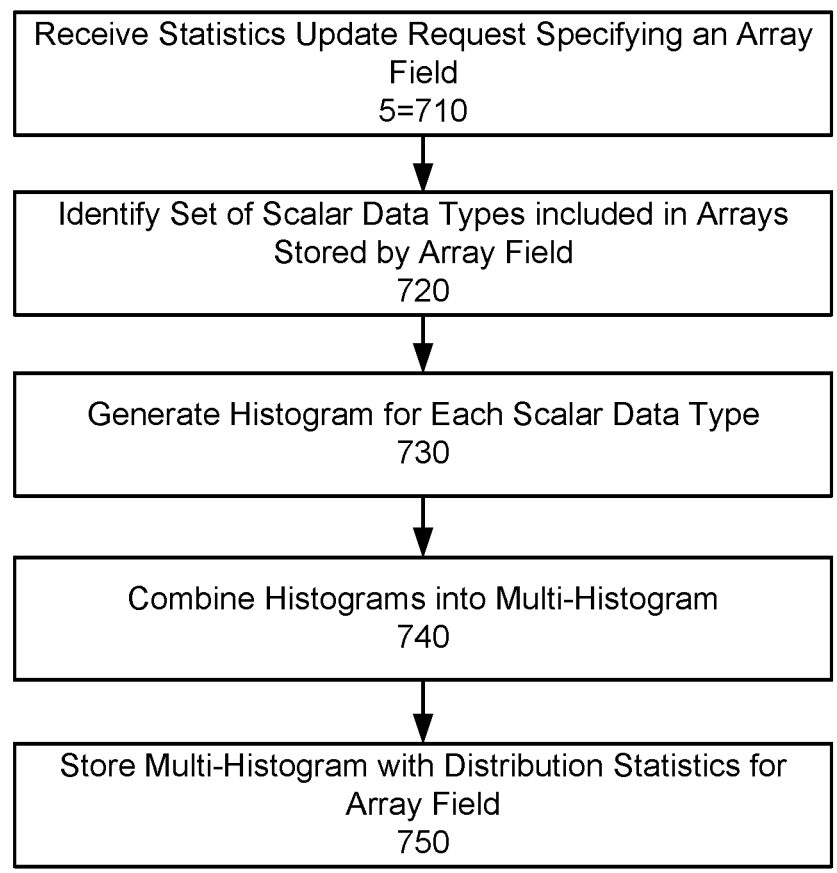
FIG. 7 is a flow chart illustrating a process for generating a multi-histogram corresponding to an array field by a document-oriented database system, according to an embodiment.

FIG. 7 is a flow chart illustrating a process 700 for generating a multi-histogram corresponding to an array field by the document-oriented database system 100, according to an embodiment. Process 700 begins with the document-oriented database system 100 receives 710 a statistics update request specifying an array field in a collection of documents stored in a document-oriented database (e.g. data store 115). The document-oriented database system 100 identifies 720 a set of scalar data types included in arrays stored by the array field. For example, the optimization statistics module 225 may identify the scalar types which the array field is configured to store (e.g. all JSON data types), or may identify the scalar types which are included in arrays the array field is currently storing (e.g. limiting to integers and strings). The document-oriented database system 100 then generates 730 a histogram corresponding to one or more scalar data types in the set of scalar data types, where the histogram describes the distribution of the data included in arrays stored by the array field of the corresponding scalar data type. From the individual histograms, the document-oriented database system 100 combines 740 the histograms into a multi-histogram, and finally stores 750 the multi-histogram in association with distribution statistics for the array field. For example, optimization statistics module 225 may store the multi-histogram in the optimization statistics store 226. As described above in relation to the process 500, the document-oriented database system 100 may also determine and store collection statistics or index statistics corresponding to the array field (e.g. collection statistics for the collection of documents including the array field or index statistics for one or more indexes corresponding to the array field). In some embodiments, the array field stores arrays including data values of only a single data type, and the document-oriented database system uses the histogram corresponding to the single data type rather than combining the histograms into a multi-histogram.

Figure 8:
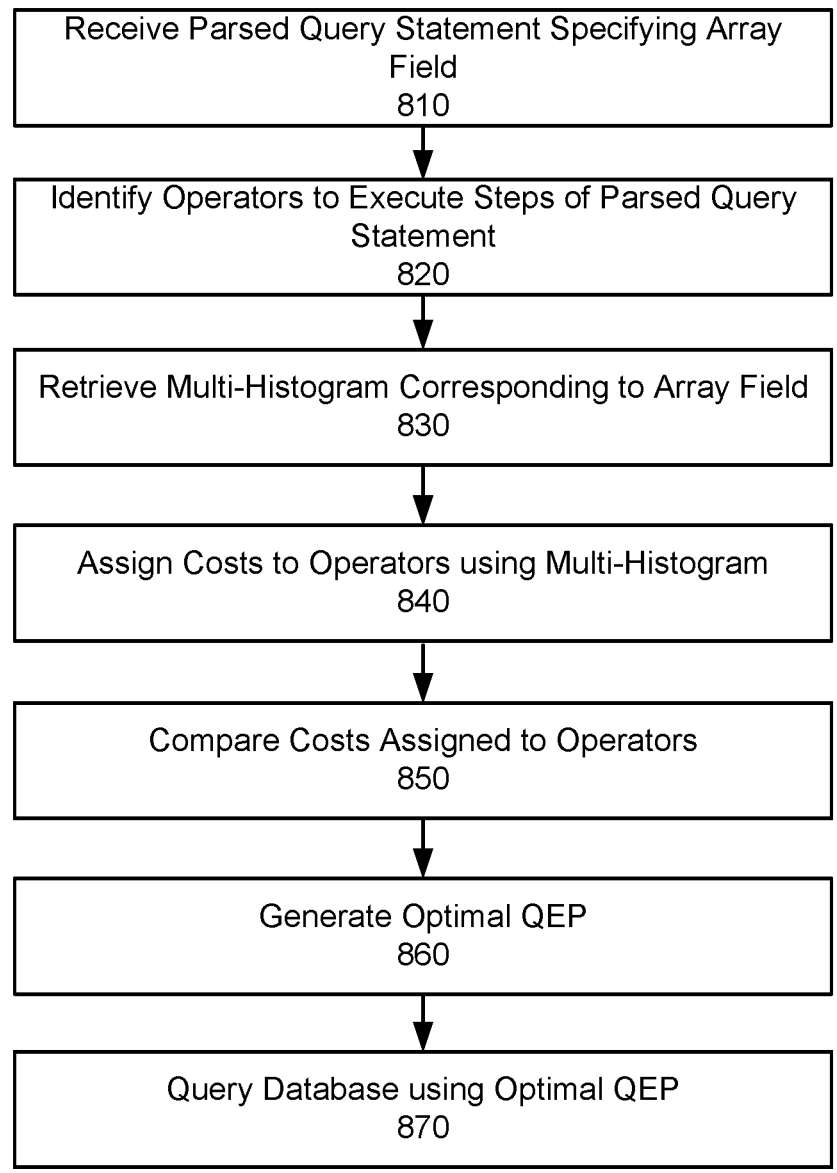
FIG. 8 is a flow chart illustrating a process for generating an optimal query execution plan to query an array field by a document-oriented database system, according to an embodiment.

FIG. 8 is a flow chart illustrating a process 800 for generating an optimal query execution plan to query an array field by the document-oriented database system 100, according to an embodiment. Process 800 begins with the document-oriented database system 100 receiving 810 a parsed query statement specifying an array field, where the parsed query statement comprises a set of steps for executing the query. For example, the query parsing module 210 may parse a query statement 200 received from a client device 120 and provide the parsed query statement 400 to the query optimization module 220. Furthermore, the query optimization module 220 may rewrite the parsed query statement 400. The document-oriented database system 100 identifies 820 operators usable to execute steps of the received parsed query statement. For example, the operator may be a fetch on an array field including a filter (e.g. fetch documents where an array for a list of prices includes $50). In order to assign costs to the identified operators, the document-oriented database system 100 retrieves 830 a multi-histogram corresponding to the array field stored by the document-oriented database system 100. The multi-histogram may have been generated and stored previously using a statistics update request, as described above in relation to FIG. 7. Additionally, the document-oriented database system 100 may generate the multi-histogram in response to receiving the parsed query statement and may also use the process described above in relation to FIG. 7. In some embodiments, the document-oriented database system 100 may retrieve a single histogram corresponding to a single scalar type included in arrays stored by the array field.

For each step included in the parsed query statement, the document-oriented database system 100 assigns 840 costs to one or more identified operators for the step using the multi-histogram. For example, the operator costing module 420 may using the array filter costing module 422 to determine or estimate the number of documents in the collection including the array field the operator will access. The document-oriented database system 100 compares 850 the costs assigned to the one or more operators and, based on the comparison, generates 860 an optimal QEP by selecting an operator for each step included in the parsed query statement. For example, the operator costing module 420 may determine an execution order for the steps and select operators for each step iteratively, such as by assigning costs to all identified operators for a single step, selecting the lowest cost operator for the step, and then proceeding to do the same for the next step, etc. Finally, the document-oriented database system 100 queries 870 the database using the generated QEP.

Other entities may perform some or all the steps of the processes 700 and 800 in other embodiments. Likewise, embodiments may include different and/or additional steps, or perform the steps in different orders.

Computer Architecture

Figure 9:
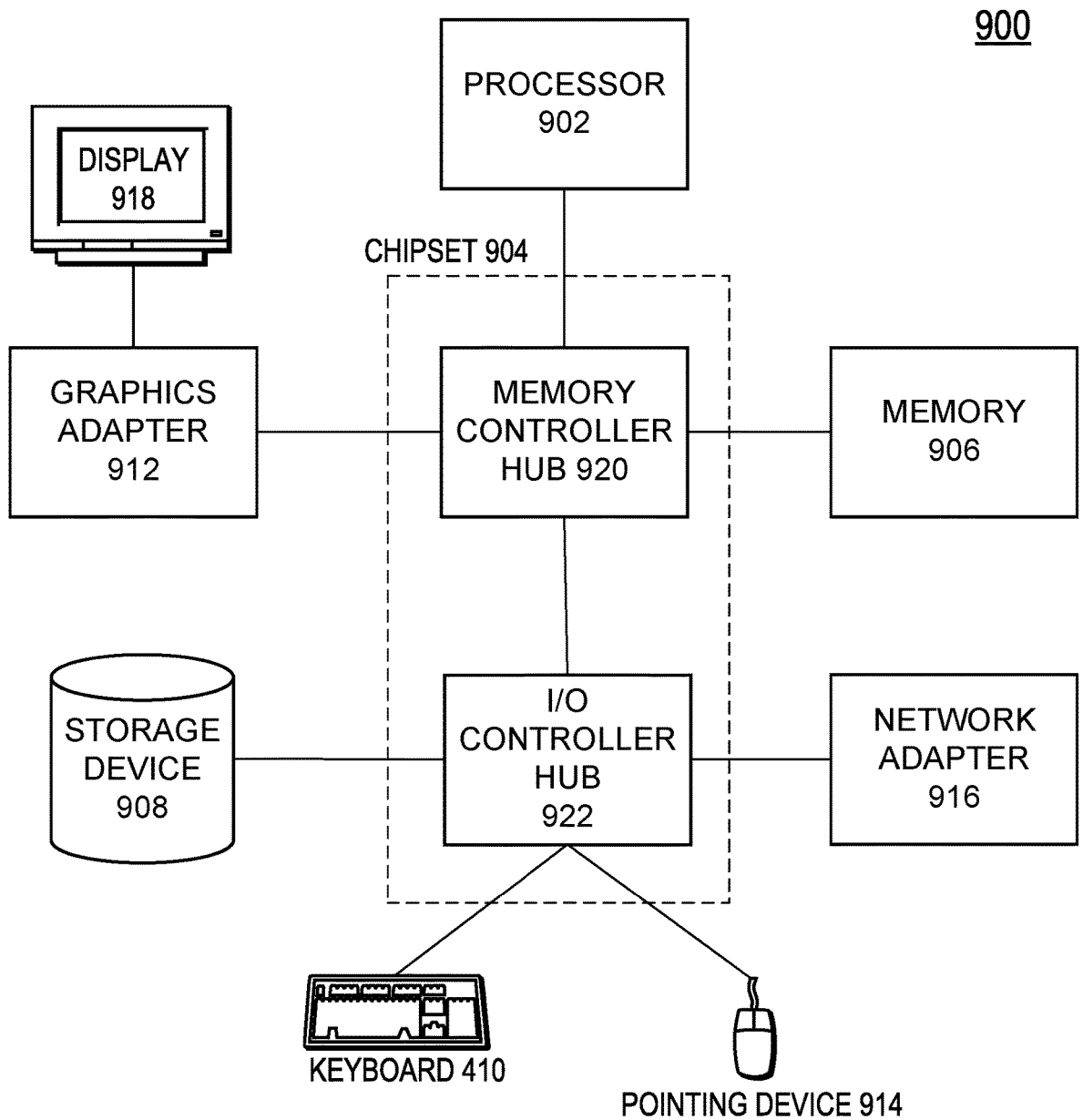
FIG. 9 is a block diagram illustrating a functional view of a typical computer system according to one embodiment.

FIG. 9 is a high-level block diagram illustrating a functional view of a typical computer system for use as one of the entities illustrated in the environment of system 100 of FIG. 1 according to an embodiment. Illustrated are at least one processor 902 coupled to a chipset 904. Also coupled to the chipset 904 are a memory 906, a storage device 908, a keyboard 910, a graphics adapter 912, a pointing device 914, and a network adapter 916. A display 918 is coupled to the graphics adapter 912. In one embodiment, the functionality of the chipset 904 is provided by a memory controller hub 920 and an I/O controller hub 922. In another embodiment, the memory 906 is coupled directly to the processor 902 instead of the chipset 904.

The storage device 908 is a non-transitory computer-readable storage medium, such as a hard drive, compact disk read-only memory (CD-ROM), DVD, or a solid-state memory device. The memory 906 holds instructions and data used by the processor 902. The pointing device 914 may be a mouse, track ball, or other type of pointing device, and is used in combination with the keyboard 910 to input data into the computer system 900. The graphics adapter 912 displays images and other information on the display 918. The network adapter 916 couples the computer system 900 to a network.

As is known in the art, a computer 900 can have different and/or other components than those shown in FIG. 4. In addition, the computer 900 can lack certain illustrated components. For example, a computer system 900 acting as a server computer 110 may lack a keyboard 910 and a pointing device 914. Moreover, the storage device 908 can be local and/or remote from the computer 900 (such as embodied within a storage area network (SAN)).

The computer 900 is adapted to execute computer modules for providing the functionality described herein. As used herein, the term "module" refers to computer program instruction and other logic for providing a specified functionality. A module can be implemented in hardware, firmware, and/or software. A module can include one or more processes, and/or be provided by only part of a process. A module is typically stored on the storage device 908, loaded into the memory 906, and executed by the processor 902.

The types of computer systems 900 used by the entities of FIG. 1 can vary depending upon the embodiment and the processing power used by the entity. For example, a client device 120 may be a mobile phone with limited processing power, a small display 918, and may lack a pointing device 914. The server computer 110, in contrast, may comprise multiple blade servers working together to provide the functionality described herein.

Additional Considerations

The particular naming of the components, capitalization of terms, the attributes, data structures, or any other programming or structural aspect is not mandatory or significant, and the mechanisms that implement the embodiments described may have different names, formats, or protocols. Further, the systems may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain embodiments described herein include process steps and instructions described in the form of an algorithm. It should be noted that the process steps and instructions of the embodiments could be embodied in software, firmware or hardware, and when embodied in software, could be downloaded to reside on and be operated from different platforms used by real time network operating systems.

The embodiments described also relate to apparatuses for performing the operations herein. An apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present embodiments are not described with reference to any particular programming language. It is appreciated that a variety of programming languages may be used to implement the teachings of the embodiments as described herein.

The embodiments are well suited for a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the embodiments is intended to be illustrative, but not limiting.

We claim:

1. A method for optimizing queries of databases, the method comprising:
   storing by a document-oriented database system, a collection of documents comprising a plurality of fields, the plurality of fields including an untyped field, wherein the untyped field stores data of a first type in a first set of documents from the collection and data of a second type in a second set of documents from the collection;
   generating a first histogram for the data of the first type, the first histogram describing the distribution of the data stored by the untyped field in the first set of documents;
   generating a second histogram for the data of the second type, the second histogram describing the distribution of the data stored by the untyped field in the second set of documents;
   combining the first histogram and the second histogram into a multi-histogram;
   receiving, by the document-oriented database system, a query statement for querying a document-oriented database, the query statement specifying the untyped field;
   identifying a plurality of operators for executing the query statement;
   assigning a cost to each operator from the plurality of operators based on the multi-histogram, the assigning comprising:
      determining, using the multi-histogram, a number of documents from the plurality of documents which include one or more data values stored by the untyped field, the one or more data values selectable by a filter corresponding to the operator; and
      determining the cost of the operator based on the number of documents which include the one or more data values;
   comparing the costs assigned to each of the plurality of operators;
   generating, based on the comparison, an optimal query execution plan; and
   querying the document-oriented database using the optimal query execution plan.

2. The method of claim 1, wherein generating the multi-histogram further comprises:
   receiving a request to generate the multi-histogram, the request specifying the collection of documents and the untyped field;
   identifying a set of scalar data types corresponding to data stored by the untyped field in the plurality of documents, the set of scalar data types including the first data type and the second data type,
   wherein the multi-histogram includes histograms for each of the set of scalar data types; and
   storing, by the document-oriented database system, the multi-histogram.

3. The method of claim 2, wherein generating each of the first histogram and the second histogram comprises:
   receiving a histogram resolution for the histogram, the histogram resolution indicating a number of histogram bins included in the histogram;
   generating a plurality of histogram bins based on the histogram resolution, each histogram bin representing a range of values stored by the untyped field; and
   combining the plurality of histogram bins to generate the histogram.

4. The method of claim 3, wherein each histogram bin includes a size, a percentage of unique values of the first type in the range, and a maximum value of the first type in the range.

5. The method of claim 4, wherein generating the plurality of histogram bins further comprises:
   receiving a sample size for the histogram, the sample size indicating a number of documents from the set of documents corresponding to the histogram;

retrieving, by the document-oriented database system, a subset of documents from the set of documents based on the sample size; and determining the size, the percentage of unique values, and the maximum value for each histogram bin in the plurality of histogram bins based on the values stored by the untyped field in the subset of documents.

6. The method of claim 5, further comprising:

determining a value of the first data type included in a range represented by a histogram bin from the plurality of histogram bins, the value occurring in a threshold number of documents including values represented by the histogram bin;

generating an overflow histogram bin representing the value; and combining the plurality of histogram bins with the overflow bin to generate the histogram.

7. The method of claim 2, wherein the request is automatically generated by the document-oriented database system.

8. The method of claim 2, wherein the untyped field stores data of an object type, the object type comprising a plurality of fields storing data of one or more data types in the set of scalar types.

9. The method of claim 8, wherein generating the histogram for each data type in the set of scalar data types further comprises:

for each data type in the set of scalar data types:
identifying the generated histogram corresponding to the data type; and
updating the histogram based on data of the data type stored by the plurality of fields comprised by the object type.

10. The method of claim 1, wherein the filter comprises a range of values between a start value and an end value, wherein the start value is of a first type and the end value is of a second type, wherein determining the number of documents comprises:

identifying a first histogram bin for a first histogram of the multi-histogram, the first histogram for the first type;
identifying a second histogram bin for a second histogram of the multi-histogram, the second histogram for the second type;
determining the number of documents based on at least the first histogram bin and the second histogram bin.

11. The method of claim 10, wherein the number of documents is determined based on each of the bins of the multi-histogram between the first histogram bin and the second histogram bin.

12. The method of claim 1, further comprising:

storing, by the document-oriented database system, an index corresponding to the untyped field, the index including a plurality of keys corresponding to data values stored by the untyped field; and
determining index statistics for the untyped field, the index statistics including a number of unique documents in the collection including data values corresponding to the keys in the index.

13. A non-transitory computer readable storage medium storing instructions that when executed by a computer processor, cause the computer processor to perform the steps comprising:

storing by a document-oriented database system, a collection of documents comprising a plurality of fields, the plurality of fields including an untyped field, wherein the untyped field stores data of a first type in a first set of documents from the collection and data of a second type in a second set of documents from the collection;

generating a first histogram for the data of the first type, the first histogram describing the distribution of the data stored by the untyped field in the first set of documents;

generating a second histogram for the data of the second type, the second histogram describing the distribution of the data stored by the untyped field in the second set of documents;

combining the first histogram and the second histogram into a multi-histogram;

receiving, by the document-oriented database system, a query statement for querying a document-oriented database, the query statement specifying the untyped field;

identifying a plurality of operators for executing the query statement;

assigning a cost to each operator from the plurality of operators based on the multi-histogram, the assigning comprising:

determining, using the multi-histogram, a number of documents from the plurality of documents which include one or more data values stored by the untyped field, the one or more data values selectable by a filter corresponding to the operator; and determining the cost of the operator based on the number of documents which include the one or more data values;

comparing the costs assigned to each of the plurality of operators;

generating, based on the comparison, an optimal query execution plan; and querying the document-oriented database using the optimal query execution plan.

14. The non-transitory computer readable storage medium of claim 13, wherein generating the multi-histogram further comprises:

receiving a request to generate the multi-histogram, the request specifying the collection of documents and the untyped field;

identifying a set of scalar data types corresponding to data stored by the untyped field in the plurality of documents, the set of scalar data types including the first data type and the second data type, wherein the multi-histogram includes histograms for each of the set of scalar data types; and storing, by the document-oriented database system, the multi-histogram.

15. The non-transitory computer readable storage medium of claim 14, wherein generating each of the first histogram and the second histogram comprises:

receiving a histogram resolution for the histogram, the histogram resolution indicating a number of histogram bins included in the histogram;

generating a plurality of histogram bins based on the histogram resolution, each histogram bin representing a range of values stored by the untyped field; and combining the plurality of histogram bins to generate the histogram.

16. The non-transitory computer-readable storage medium of claim 14, wherein the untyped field stores data of an object type, the object type comprising a plurality of fields storing data of one or more data types in the set of scalar types.

17. The non-transitory computer-readable storage medium of claim 16, wherein generating the histogram for each data type in the set of scalar data types further comprises:
for each data type in the set of scalar data types:
identifying the generated histogram corresponding to the data type; and
updating the histogram based on data of the data type stored by the plurality of fields comprised by the object type.

18. The non-transitory computer readable storage medium of claim 13, wherein the filter comprises a range of values between a start value and an end value, wherein the start value is of a first type and the end value is of a second type, wherein determining the number of documents comprises:
identifying a first histogram bin for a first histogram of the multi-histogram, the first histogram for the first type;
identifying a second histogram bin for a second histogram of the multi-histogram, the second histogram for the second type;
determining the number of documents based on at least the first histogram bin and the second histogram bin.

19. The non-transitory computer readable storage medium of claim 18, wherein the number of documents is determined based on each of the bins of the multi-histogram between the first histogram bin and the second histogram bin.

20. A computer system comprising:
a computer processor; and
a non-transitory computer readable storage medium for storing instructions that when executed by a computer processor cause the computer processor to perform steps comprising:
storing by a document-oriented database system, a collection of documents comprising a plurality of fields, the plurality of fields including an untyped field, wherein the untyped field stores data of a first type in a first set of documents from the collection and data of a second type in a second set of documents from the collection;
generating a first histogram for the data of the first type, the first histogram describing the distribution of the data stored by the untyped field in the first set of documents;
generating a second histogram for the data of the second type, the second histogram describing the distribution of the data stored by the untyped field in the second set of documents;
combining the first histogram and the second histogram into a multi-histogram;
receiving, by the document-oriented database system, a query statement for querying a document-oriented database, the query statement specifying the untyped field;
identifying a plurality of operators for executing the query statement;
assigning a cost to each operator from the plurality of operators based on the multi-histogram, the assigning comprising:
determining, using the multi-histogram, a number of documents from the plurality of documents which include one or more data values stored by the untyped field, the one or more data values selectable by a filter corresponding to the operator; and
determining the cost of the operator based on the number of documents which include the one or more data values;
comparing the costs assigned to each of the plurality of operators;
generating, based on the comparison, an optimal query execution plan; and
querying the document-oriented database using the optimal query execution plan.

* * * * *